(12) United States Patent
Dariol et al.

(10) Patent No.: US 11,980,973 B2
(45) Date of Patent: May 14, 2024

(54) WELD SPOT ANALYTICS

(71) Applicant: Robert Bosch GmbH, Stuttgart (DE)

(72) Inventors: Matteo Dariol, Hoffman Estates, IL (US); Benjamin Menz, Floersbachtal (DE); Scott Hibbard, Chicago, IL (US); Yaozhong Chen, Glen Ellyn, IL (US)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 17/226,916

(22) Filed: Apr. 9, 2021

(65) Prior Publication Data

US 2021/0316403 A1 Oct. 14, 2021

Related U.S. Application Data

(60) Provisional application No. 63/007,821, filed on Apr. 9, 2020.

(51) Int. Cl.
*B23K 31/12* (2006.01)
*B23K 31/00* (2006.01)
*G05B 19/4155* (2006.01)
*G06N 3/08* (2023.01)

(52) U.S. Cl.
CPC .......... *B23K 31/125* (2013.01); *B23K 31/006* (2013.01); *G05B 19/4155* (2013.01); *G06N 3/08* (2013.01); *G05B 2219/32368* (2013.01); *G05B 2219/45135* (2013.01)

(58) Field of Classification Search
CPC ............ G05B 19/0428; G05B 19/4186; G05B 2219/25157; G05B 2219/36542
See application file for complete search history.

(56) References Cited

U.S. PATENT DOCUMENTS

| | | | |
|---|---|---|---|
| 2017/0032281 A1* | 2/2017 | Hsu ................. | G05B 19/41875 |
| 2018/0250763 A1* | 9/2018 | Kita .................... | B23K 9/1006 |
| 2018/0361514 A1* | 12/2018 | Narayanan .......... | B23K 9/0953 |
| 2020/0139471 A1 | 5/2020 | Pliska et al. | |
| 2021/0046642 A1* | 2/2021 | Luis y Prado ....... | B25J 11/0055 |
| 2021/0078093 A1* | 3/2021 | Ivkovich ............. | B23K 9/0953 |
| 2021/0318673 A1* | 10/2021 | Kitchen .............. | B23K 31/006 |

OTHER PUBLICATIONS

Rexroth a Bosch Company, Weld Spot Analytics, website: https://www.boschrexroth.com/en/us/products/product-groups/welding-technology/weld-spot-analytics/index, Copyright 2014-2021 (2 Pages).

* cited by examiner

*Primary Examiner* — Charles R Kasenge
(74) *Attorney, Agent, or Firm* — Michael Best & Friedrich LLP (57) ABSTRACT

A weld analytics system and method of tracking weld quality for a group of sequential welds. In one example, a weld analytics system receives a welding plan for a plurality of welds being performed by at least one welding machine. The weld analytics system determines an overall weld quality for the plurality of welds, based at least upon weld data from the at least one welding machine; and transmits a signal indicative of the overall weld quality of the plurality of welds to an interactive user terminal.

15 Claims, 4 Drawing Sheets

WELD SPOT ANALYTICS

CROSS-REFERENCE TO RELATED APPLICATIONS

This application claims the benefit of prior-filed, U.S. Provisional Application No. 63/007,821, filed Apr. 9, 2020, and the entire contents of which are hereby incorporated by reference.

BACKGROUND

The invention relates to improved welding techniques.

Welding systems sometimes incorporate automated machinery for performing welds. In theory, the incorporation of automated machinery should increase the precision, reproducibility, and quality of the welds. However, this is not always the case—designs may change, automated machinery may deteriorate, power supply to the welding equipment may change, plant infrastructure may change, welding materials may change, environmental conditions such as humidity or air purity may change, and so forth. Changes affecting the technical function of a welding system may occur unpredictably and may be difficult and time consuming to adapt the welding equipment to, especially if consistent weld quality is needed. There is, therefore, a need for an agile system of data collection, model sharing, analytics, and technical adaptation throughout such a welding system.

In an automated welding system incorporating robotic welders, items to be welded may be placed near a robotic welder. The welder may then weld the item according to a predetermined routine, and may be equipped to make minor mechanical adjustments in the routine in an attempt to ensure that certain spacing tolerances are maintained even if equipment shifts. However, because a welding routine may be complicated, such tolerances may need to be confirmed or adjusted manually by a human laborer. Additionally, such minor mechanical adjustments may not address the aforementioned factors, for example, changes in humidity. Thus, weld quality may still need to be routinely confirmed by destructive testing—a process by the quality of a weld is tested by applying force to the weld via a piece of the welded item proximal to the weld. In this way, weld quality is confirmed if it is determined that even though the item incorporating the weld was destroyed through the destructive testing process, the weld was not separated. However, destruction of welded items to test weld quality is wasteful and undesirable. As an alternative to destructive testing, welds may be tested by non-destructive methods such as ultrasound inspection. However, similar to destructive testing, ultrasound testing requires parts to be welded and subsequently tested, which takes extra time and additionally has the downside of placing emphasis on a human tester's opinion of what represents a quality weld. There is therefore a need for a method of welding that properly ensures an adaptive yet consistent weld quality while reducing the need for post-weld testing.

SUMMARY

According to a number of embodiments, an adaptive welding system includes a plurality of connected welding machines. The plurality of connected welding machines are connected across a plurality of welding plants. An edge computing system is configured to gather weld data a welding machine and transmit the weld data to a local or remote weld analytics system. The weld analytics system is configured to receive the weld data from the edge computing system and to optimize an operational model for the welding machine based on the weld data.

According to a number of embodiments, a method of tracking weld quality for a group of sequential welds includes using a weld analytics system to receive a welding plan for a plurality of welds as performed by a welding machine configured to provide weld data to a weld analytics system while welding. The weld analytic system then determines an overall weld quality for the plurality of welds based on weld data from the welding machine. The weld analytic system transmits a signal indicative of the overall weld quality of the plurality of welds to an interactive user terminal configured to receive the weld data from the welding machine.

Other embodiments and aspects will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As used within this document, "welding machine operational factors" may mean a welding machine environmental factors, for example, humidity, ambient heat, conductivity, elevation, weather, airflow, dust, smoke, shelter, or another environmental factor. "Welding machine operational factors" may also mean actions taken by the welding machine, for example, alignment for a performing a weld, movements post-weld, cable management movements, etc.

As used within this document, the word "or" may mean inclusive or. As a non-limiting example, if it we stated in this document that "item Z may comprise element A or B," this may be interpreted to disclose an item Z comprising only element A, an item Z comprising only element B, as well as an item Z comprising elements A and B.

In a number of embodiments, welding machine performance is monitored and analyzed by way of monitoring welding machine health or state of degradation. Welding tip wear detection, cable wear detection, and other types of welding equipment health are monitored and factored into operational models used with welding machines, welding timers, or welding floor components. Monitoring and collection of welding machine health data or state of degradation data regarding equipment health may be adaptable to a situational desirability. As a non-limiting example, in some cases, cable wear is largely ignored unless the wear is extensive. In such cases, data collection systems, monitoring systems, and operational model optimization systems are constructed and arranged to largely ignore cable wear.

In a number of embodiments, welding machine performance is monitored by detecting trends amongst the welds performed by the welding machine. Weld data performance circumstances, for example, welding voltage, or welding current are monitored or data collected thereon. Weld quality indicators, for example, process stability factor (PSF), weld energy delivered factor (WEDF), splatter or expulsion are monitored or data collected thereon. Weld group quality indicators, for example, welding machine group performance, welding timer group performance, or welding floor component group performance are monitored by way of a weld analytics system collecting data thereon. Such monitoring or data collection may also be adaptable to situational desirability. As a non-limiting example, expulsion or splatter trend detection may be constructed and arranged to only collect data or report on some cases of expulsion or splatter.

In a number of embodiments, PSF is a value or measurement pertaining to a welding process that indicates the quality of the welding process that produces a particular weld. WEDF is a value or measurement pertaining to a weld that indicates the weld quality based upon a number of factors, for example, weld strength, current/voltage delivered to create the weld, weld shape, weld depth, and so forth. In a number of embodiments, PSF or WEDF is measured in-process rather than post-weld. Additionally, these two metrics are correlated to welding plant operation states and statistics to provide plant operators with sufficient information to anticipatorily make adjustments to an automated welding process or to a particular automated welder to ensure initial weld quality as well as consistent and continuous weld quality. PSF and WEDF are provided by welding machines as welding is in process. Further, a plurality of welding machines across a plurality of plants transmit weld-quality and process-stability related data, for example, PSF, WEDF, expulsion or splatter data, component wear data, equipment health data, power data, for example, phase angle data, materials data, for example, material type, thickness of material, or number of layers sheets of material, environmental data, for example, humidity or elevation data, welding machine group quality data, weld group quality data, and any other weld data for determining weld-quality or weld. As such data is collected, it is centralized and analyzed by a weld analytics system with the goal of recognizing and adjusting trends via adjustments to particular, targeted welding machines or adjusting trends via adjustments to groups of welding machines. Collected data may is correlated to show which circumstances yield the best welds or groups of welds and prompts may be dispatched suggesting targeted adjustments to remedy poor weld quality resulting from underperforming welding machines, welding timers, or welding floor components.

In a number of embodiments, a welding machine is tasked with welding an item within operational distance of it by a welding line. The welding machine has a predetermined routine for performing the welds that it is tasked with. Upon determining that every tolerance for each weld performed by the machine will be met as the welds are performed, the machine performs each weld and transmit data about each weld to a weld analytics system. The weld analytics system is constructed and arranged to draw upon stored or incoming weld quality and process stability related data from a plurality of welding machines distributed across a plurality of welding plants. For example, a first welding machine is positioned in a first welding plant, and a second welding machine is positioned in a second welding plant. Further, a user has access to analytics from a weld analytics system that are constructed and arranged to correlate the data from the plurality of welding machines and identify patterns. This data may be anonymously collected across a plurality of welding machines across a plurality of customers so that a cooperative improvement of any given welding machine occurs without objection across numerous customers.

In a number of embodiments, feedback or analytics provided by a weld analytics system is adjustable to customer needs. As a non-limiting example, for applications requiring lesser-quality welds, welding machine component wear may be allowed to progress further than it would in applications requiring higher-quality welds before any sort of warning about welding machine component wear is produced by the weld analytics system.

In a number of embodiments, a weld analytics system includes a network of at least one welding machine and a cloud computing service. In such embodiments, a welding machine collects data as it performs a weld. In some cases, this data collection occurs via software translating any welding machine hardware inputs and outputs to digitally interpretable figures or numbers. In other cases, this data is in the form of analog signals that are communicated to an intermediary system, for example, a multiplexing circuit that changes the analog signals to digitally interpretable figures or numbers before a data is communicated to the cloud service.

In a number of embodiments, a weld analytics system includes a network of at least one welding machine, at least one edge computing device, and a cloud computing service. In such cases, a welding machine collects data as it performs a weld and communicate this data to an edge computing device. In some embodiments edge computing devices include a computing devices, for example, a hardware-accelerated computing device constructed and arranged to facilitate machine-learning enabled data analysis and deployment of that data analysis to at least one cell computing device running welding software for at least one welding machine.

In a number of embodiments, a cloud computing service includes a machine-learning subnetwork that is generally tasked with enhancing the welding process by identifying causal relationships between welding machine operational factors and any positive or negative weld quality or process quality trends that flow therefrom. In some embodiments, the machine-learning subnetwork builds machine learning models deployable to a repository within a weld analytics system where the models are accessed by or transmitted to an edge computing device. The machine learning subnet builds machine learning models with the aim of fostering or reproducing positive trends or reducing the negative trends in welding operations as performed by welding machines utilizing the weld analytics system. The machine learning subnet accomplishes this in part by making the models available to any edge computing devices that are instrumental in adjusting software controls used by the welding machines. In some embodiments, machine-learning occurs via the cloud service on the basis of raw weld data as provided by an edge computing device or directly from a welding machine.

In a number of embodiments, the weld analytics system includes features that enable a data scientist or software developer to contribute to, guide, or train a machine-learning subnetwork within a weld analytics system by injecting data, code, or directives to the machine learning subnet via a user terminal. Data is injected to the machine-learning subnet in the form, for example, of images, audio, spreadsheets or other data files, alpha-numeric data, digital data, for example, or other data that may be interpretable by a machine-learning algorithm. Code or directives injected into the machine-learning subnet may be in form of a computer programming language, or directives according to visual languages or a communication scheme devised by the data scientist or software developer that is effective for communicating with a machine-learning subnetwork.

In a number of embodiments, the weld analytics system includes features that enable a lab technician or lab testing equipment to contribute to, guide, or train a machine-learning subnetwork within a weld analytics system by selecting and injecting test results or test cases to the machine learning subnet via a network connection. In such embodiments, test cases or test results are submitted to the machine learning subnet in a form, directly submitted in a file format, or translated to data that is injected to the machine-learning subnet. Test cases or test results may also be submitted to the machine-learning in the form of, for example, images, audio, spreadsheets or other data files, alpha-numeric data, digital data, for example, raw bytes, or any other sort of data that may be interpretable by a machine-learning algorithm. Code or directives may be injected into the machine-learning subnet by lab technicians or lab equipment as well. Such code or directives may be in forms such as but not limited code in any computer programming language, or directives as deemed acceptable according to a new language, for example, visual languages or a communication scheme that is effective for communicating with a machine-learning subnetwork.

In a number of embodiments, the weld analytics system requires authorization by an operator, manager, administrator, or other individual before making an adjustment to at least one of a machine-learning model, a machine-learning model repository, a weld analytics system algorithm or subnet. In such embodiments, an authorization is required by the system to come from an individual who has permission within the system to make such an authorization. In some cases, such permissions are given on the basis of classic hierarchical authority over a given business or technological area. In keeping with this notion, the weld analytics system may be operationally divisible by both technological boundaries and business boundaries for the purpose of identification of which areas of business or technology may be affected by a given model deployment, code deployment, data injection, or other adjustment, update, or modification, and in turn for the purpose of identifying which permissions a given individual archetype has.

In a number of embodiments, a welding machine is connected to the internet via a wired or wireless connection or directly to the weld analytics system via a wired or wireless connection such that the welding machine is enabled to receive updates or upgrades via a weld analytics system. In addition, the welding machine may be connected to other welding machines via a network or the internet via a wired or wireless connection. In some embodiments, the welding machine is connected to an edge computing device via a wired or wireless connection. In this way, not only can the welding machine receive updates or upgrades from the weld analytics system, the welding machine may also receive modified versions of such updates from an edge computing device. Further, by being connected to other welding machines, the welding machine may still receive a targeted update via its connection to other welding machines even if the target welding machine loses its connection to the source of the update.

In a number of embodiments, a machine learning system runs simulations emulating situational welding machine or welding timer scenarios. Such scenarios may be run by the machine learning system at an accelerated rate to produced simulated models which the machine learning system trains to improve a simulated welding machine, welding timer, or welding floor component's approach to achieving a goal communicated to it by another system or component within a weld analysis system. In some embodiments, a cloud computing service includes a management subnet that is configured to accept data and models for the machine learning system from a machine learning trainer, for example, a data scientist or a developer. The data and models may include curated data or operational models pertaining to a welding machine, a welding timer, or a welding floor component. Contribution by a machine learning trainer may also come in the form of manual adjustments to parameters being used in simulations run by the machine learning system. In some embodiments, a machine learning system learns via the use of a neural network or other software-based learning devices to recognize patterns regarding how adjustments to particular operational parameters affect the outcome of a simulation and make adjustments to those operational parameters in an attempt to improve the outcome of the simulation by reaching the goal of the simulation in a manner, for example, more quickly, more accurately, more efficiently, or according to some other recognizable improvement. In such embodiments, parameter adjustments leading to improvements in a model may be noted or stored by the machine learning system and attempts to further improve the model are made by using the adjusted parameters for the improved model as the base parameters for a new simulation. Such an improved model is referred to as a trained model herein.

In a number of embodiments, a method of tracking weld quality for a group of sequential welds includes providing a weld analytics system constructed and arranged to receive weld data from at least one welding machine, at least one welding timer, or at least one welding floor component. In such embodiments, the at least one welding machine, the at least one welding timer, or the at least one welding floor component is configured to provide weld data to the weld analytics system while executing a welding floor process. A cell computer in communication with the welding machine, welding timer, or welding floor component communicates to the weld analytics system a welding plan for a plurality of welds as performed by the at least one welding machine. In some embodiments, the communication of the plan by the cell computer to the weld analytics system occurs over a local network, but in other embodiments the plan may be communicated to the weld analytics system via another device such as an edge computing device or directly via a cloud computing service. Based on the received welding plan and any other received weld data, the weld analytics system determines an overall weld quality for the plurality of welds. The weld analytics system subsequently transmits a signal indicative of the overall weld quality of the plurality of welds to an interactive user terminal, and an operator, technician, or other user may make adjustments to the at least one welding machine, welding timer, or welding floor component based at least upon information or an interactive prompt displayed on the user terminal based on the signal indicative of the overall weld quality of the plurality of welds. It is contemplated that the plurality of welds every weld necessary to complete all welds needed for the manufacture of a particular item and that in such cases the weld analytics system determines an overall weld quality for the item and transmit a signal indicative of such to a user terminal. It is further contemplated that the same process or a similar process may occur with a singular weld.

Figure 1:
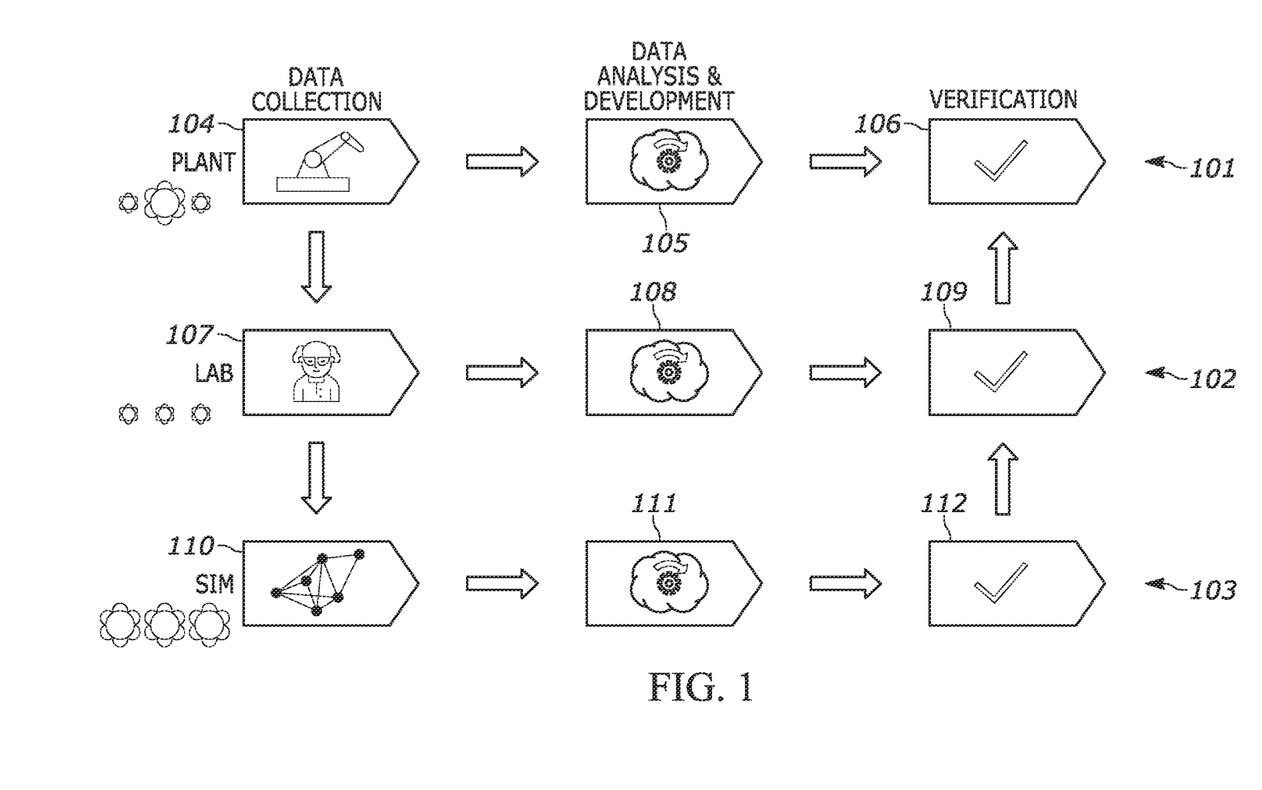
FIG. 1 illustrates a hybrid model of data collection, development, and analysis according to a number of embodiments.

FIG. 1 depicts a hybrid model of data collection, development, and analysis. In the embodiment depicted by FIG. 1, a multi-layered cooperative process is used to develop new operational models for a welding timer, a welding machine, or welding floor components. Welding floor components may include powered welding positioners, powered tables or shelves, safety equipment, robotics, or welding machines.

A plant-level layer 101 is the basis upon which a lab-level layer 102 and a simulation-level layer 103 build. At the plant-level layer 101, within a plant-level production process 104 a welding machine, a welding timer, or welding floor component performs a welding floor process, for example, a weld in real time on a production line according to an operational model. While performing the welding floor process, a welding machine, a welding timer, or a welding floor component collects data on each process step performed. That data, in some cases along with the operational model, is delivered to a weld analytics system 105. The weld analytics system 105 analyzes the data using machine learning. Optimization simulations are run on the data or operational models passed to the weld analytic system 105 by the plant-level production process 104 to produce optimized plant-level data.

The optimized plant-level data is used by the weld analytics system 105 to build an optimized operational model or to modify an operational model to produce an optimized operational model. The optimized operational model is then used in a plant-level verification process 106 wherein the optimized operational model is used in a welding machine, welding timer, or welding floor component. In the embodiment shown, the welding machine, welding timer, or welding floor component in the plant-level verification process 106 are the same welding machine, welding timer, or welding floor component from the plant-level production process 104—however, this is not always the case.

At the lab-level layer 102, a lab technician or scientist synthesizes at least one welding floor process in a lab-level study process 107. The lab technician attempts to synthesize at least one moment, circumstance, or element of an existent or anticipated welding floor process, for example, a particular weld in a particular environment with particular components that are in a particular condition. During the lab-level study process 107 the lab technician or scientist synthesizes an aspect of the welding floor process using a welding machine, welding timer, or welding floor component. In doing so, lab data pertaining to the synthesized welding floor process is generated. While synthesizing the welding floor circumstance, the welding machine, welding timer, or welding floor component collects data on each weld performed. The lab technician examines the data and may tune or modify the data before passing it, in some cases along with the operational model, to a weld analytics system 108.

When received by the weld analytics system 108 from the lab-level study process 107, the data or operational model is analyzed with the benefit of machine learning software for rapidly running optimization simulations and producing optimized lab-level data. The optimized lab-level data is used to build an optimized operational model or to modify an operational model and thus produce an optimized operational model. The optimized operational model is then used in a lab-level verification process 109 wherein the optimized operational model is used in a welding machine, welding timer, or welding floor component. The welding machine, welding timer, or welding floor component in the plant-level verification process 106 is the same welding machine, welding timer, or welding floor component from the plant-level production process 104.

At the simulation-level layer 103, a data scientist or software developer designs a simulation for application to an operational model. During a simulation-level investigation process 110, a data scientist or software developer designs data or operational models emulating data that might be collected by a welding machine, a welding timer, or a welding floor component during a welding floor process to have it optimized by a weld analytics system 111. The weld analytics system 111, utilizing the benefit of machine learning capabilities, is used to rapidly run optimization simulations on the data or operational models passed to it by the simulation-level investigation process 110 and produce optimized simulation-level data.

The optimized simulation-level data is used to build an optimized operational model or to modify an operational model and thus produce an optimized operational model. The optimized operational model is then used in a simulation-level verification process 112 wherein the optimized operational model is used in a simulated welding machine, welding timer, or welding floor component. If the optimized operational model fairs well in the simulated welding machine, welding timer, or welding floor component, the simulation may be recreated at the lab-level layer 102, and possibly also deployed to the plant-level layer 101. Additionally, optimized operational models may constitute trained operational models and may be reconciled, consolidated, or combined with optimized models from other layers 101, 102, 103 during verification processes 106, 109, 112.

Figure 2:
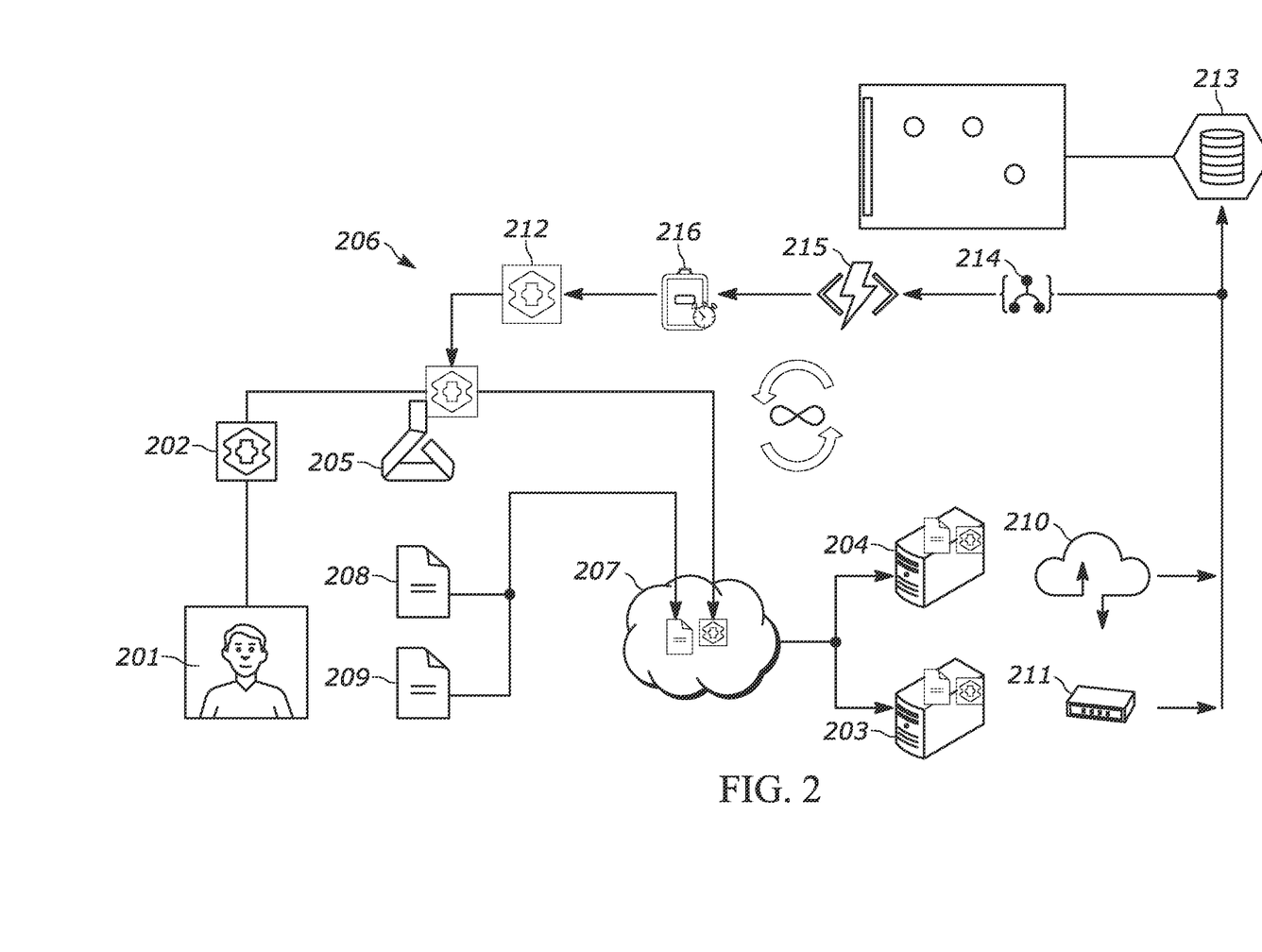
FIG. 2 illustrates a high-level deployment and management model for intelligently developing new operational models for welding equipment according to a number of embodiments.

FIG. 2 depicts a high-level deployment and management model for intelligently developing new operational models for welding equipment according to a number of embodiments. A data scientist or developer 201 constructs or contributes an initial operational model 202 that is used as a model for operation of at least one welding machine cell 203, 204. The initial operational model 202 is deposited into a model repository 205 of a weld analytics system 206. The model repository 205 may contain a number of operational models. An image is created of each operational model, and stored in an image repository 207 within the weld analytics system 206. Within image repository 207, scoring of each image occurs according to a scoring script 208. Scoring script 208 assigns a score to each image based on a an environment file 209. The environment file 209 is associated with each image, and a score is assigned to each image in light of the environment file 209.

Welding machine cell 203, 204 includes at least one of a welding machine, positioner robotics, a welding timer, or other welding floor components. In the embodiment shown, a webservice 210 is used to enhance the operation of the welding machine cell 203, 204 by accepting or collecting data pertaining to at least one of the operation of the welding machine cell 203, 204 or the use of an image of an operational model provided by the image repository 207. An edge computing system 211, for example, an edge computer is used for a similar purpose to the webservice 210 and offer differing latency or functions than the webservice 210.

Webservice 210 or edge computing system 211 transmits at least some of the collected data pertaining to at least one of the operation of the welding machine cell 203, 204 or the use of the image provided by the image repository 207 to the weld analytics system 206 for processing and the production of at least one retrained operational model 212. The transmitted data pertaining to at least one of the welding machine cell 203, 204 is used in inferencing software 213, for example, populating a dashboard for environments like internet sites or a mobile applications with items such as pertinent graphs, values, labels, highlights, or any other manner of visual display of data or analysis of data.

The transmitted data pertaining to at least one of the welding machine cell 203, 204 is also analyzed by at least one logic application 214, for example, an alert system for alerting key users via sms or email. Additionally, the transmitted data pertaining to at least one of the welding machine cell 203, 204 is routed through functional application 215, for example, a module in an automation routine. Further, the transmitted data pertaining to at least one of the welding machine cell 203, 204 is routed through a retraining routine 216 wherein the transmitted data is used alongside an operational model to retrain the operational model and produce a retrained operational model. It is contemplated that some of these steps may be performed in a different order than the order in which they are listed here. As a non-limiting example, the inferencing software 213 may be applied not only to the transmitted collected data but also to the retrained operational model 212.

Figure 3A:
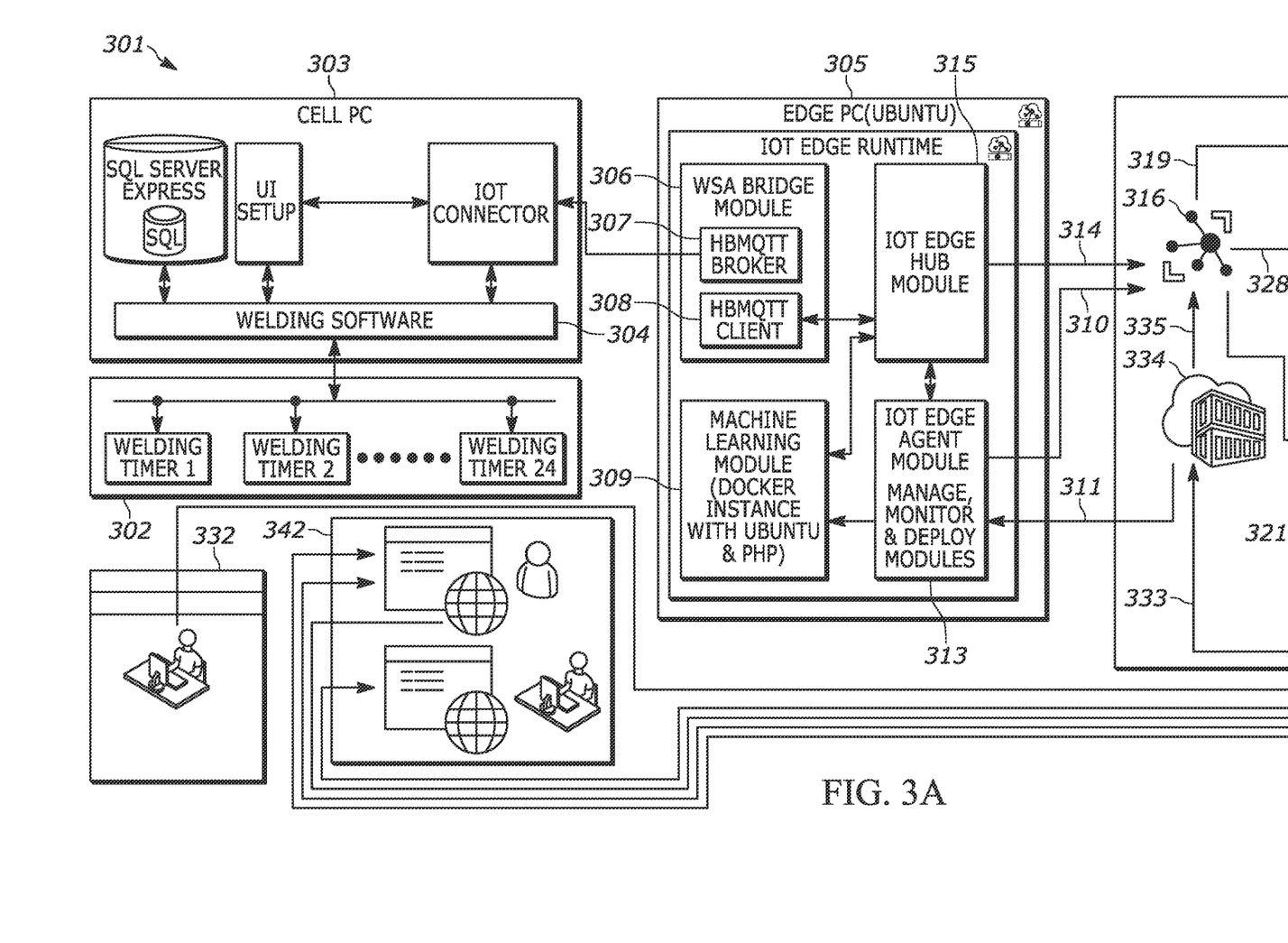
FIGS. 3a and 3b, in combination, illustrate an organizational model of data collection, development, analysis, and deployment according to a number of embodiments.
Figure 3B:
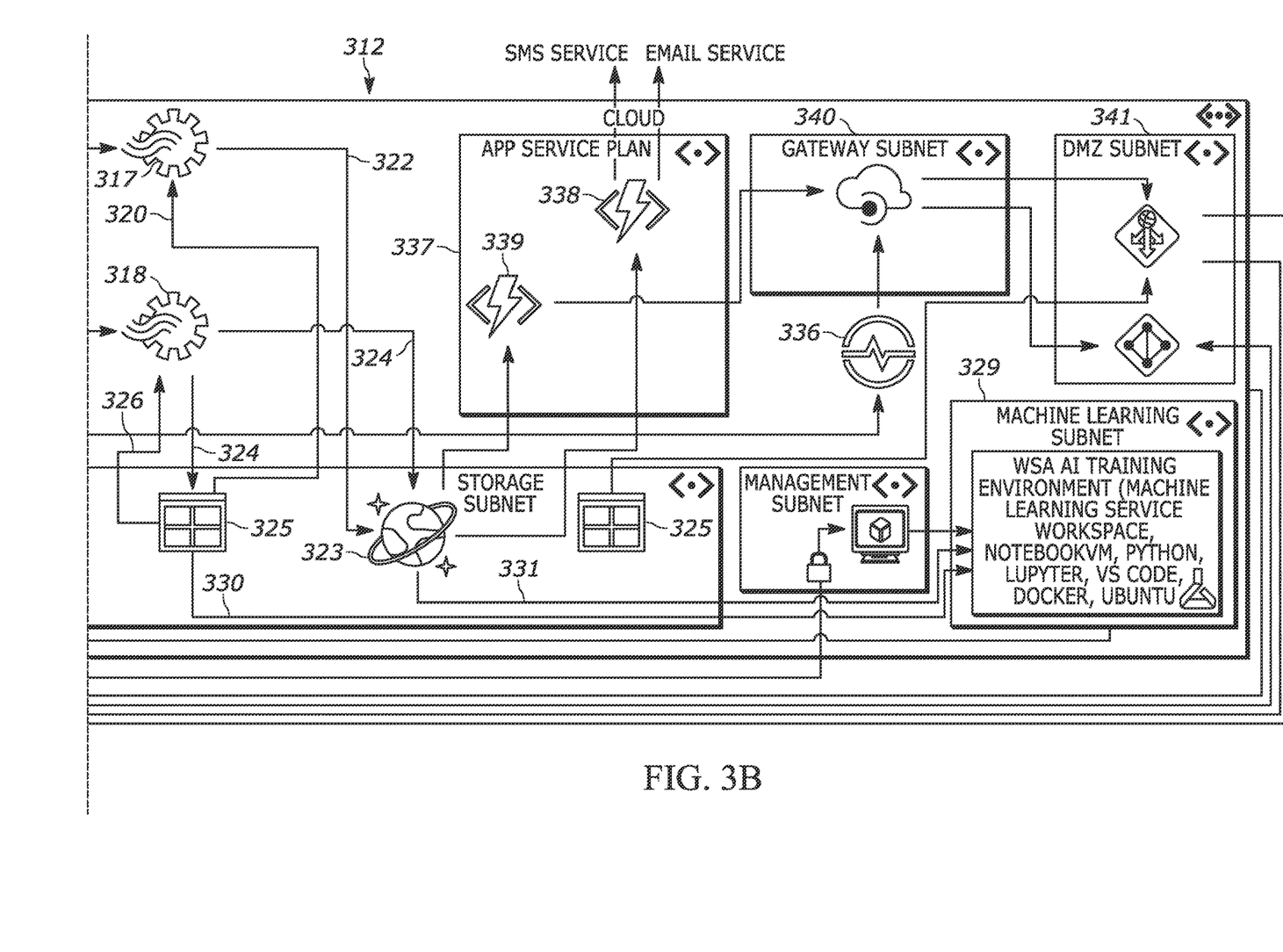

FIG. 3a and FIG. 3b together illustrate one embodiment of a weld analytics system 206. The weld analytics system 206 includes at least one weld timer 302 at least one welding machine (not shown), or at least one welding floor component and may be connected to at least one cell computer 303 which executes welding software 304. Welding software 304 executes programs to control, for example, welding machine motion control, data collection, data analysis, power management, memory management, network connection management, network communication, user interface appearance, user input via at least the user interface, database connection management, database communication, and other operations that a computer is used for accomplishing or assisting with. In the embodiment shown, each cell computer 303 is located in a welding cell. Similarly, each welding machine (not shown) weld timer 302, or welding floor component is located in a welding cell. It is contemplated that a computer located outside of a welding cell may be used as a cell computer 303. Similarly, it is contemplated that a weld timer 302 or welding floor component does not necessarily need to be located in a welding cell. Each cell computer 303 connects to an edge computer 305 and to other cell computers 303 either directly or via an edge computer 305. In the embodiment shown, each edge computer 305 is equipped with communications bridge software 306. In the example shown, the communications bridge software 306 includes client software 307 and a broker software 308 configured to support a two-way messaging protocol for communication between devices, for example, cell computers 303, weld timers 302, and welding floor components, via the edge computer 305.

Each edge computer 305 is also equipped with machine learning enabled software 309 that communicates device management data 310 to and receives operational models 311 from a cloud computing service 312 via IoT Edge Agent Software 313. Additionally, the edge computer 305 communicates weld data 314 to the cloud computing service 312 via Tot Edge Hub software 315. Weld data 314 may be analog or digital data.

Weld data 314 contains a WEDF or PSF value, or may contain data pertaining to a WEDF or PSF value that is then be processed by a cell computer 303 or an edge computer 305 to produce a WEDF or PSF value. Weld data 314 may also be modified, tuned, or processed in other manners or to produce other values by a welding machine, weld timer 302, weld floor component, cell computer 303, or edge computer 305 before being communicated to a cloud computing service 312. Device management data 310 includes operational data pertaining to the operation of a welding machine or welding floor components, for example, tolerance values, runtime values, target timing values, or measured timing values. Device management data 310 also includes experientially adjusted operational models pertaining to particular welding machines based upon previous use and adjustments, as well as operational models pertaining similarly to welding floor components. Additionally, device management data 310 may include collision detection data, power consumption data, component wear and tear data, or any other data or values pertaining to the operation of a welding machine, a weld timer 302, or a welding floor component. It is also contemplated that component wear and tear data and component degradation data may be gleaned indirectly from weld data 314.

Device management data 310 as well as weld data 314 is communicated to a cloud computing service 312 that includes a network of servers housing software modules programmed to analyze data received from a welding machine, a welding floor component, a weld timer 302, a cell computer 303, or an edge computer 305. Weld data 314 as well as device management data 310 is received at the cloud computing service 312 via an IoT Hub 316. The Tot Hub 316 sorts any raw data 324 received or operational models 335 received and makes the received data or models available to a processed data analytics module 317, raw data analytics module 318, or an API-Connected analytics module 336, for the benefit of analytical tools, for example, dashboard and alert systems. Processed data analytics module 317 may receive both processed data 319 from the IoT hub 316 as well as stored data 320 from a storage subnet 321 within the cloud computing service 312. Stored data 320 is formatted by the processed data analytics module 317 based on the intended application.

The processed data analytics module 317 analyzes the processed data 319 in light of the stored data 320 and populates dashboards for the benefit of users or monitoring systems, or to create alerts for an alert system. The processed data analytics module 317 also provides additional data pertaining to the processed data 319 along with the processed data 319. For example, the processed data analytics module 317 provide analysis data or metadata to a database service 323 as additionally processed data 322. The additionally processed data 322 is delivered from the processed data analytics module 317 to the database service 323 within the storage subnet 321 of the cloud computing service 312. The additionally processed data 322 may in content simply be the original processed data 319 in a form that is no further modified or processed, being accompanied by no additional data such as analysis data or metadata.

In the embodiment shown, the database service 323 performs horizontal scaling and thereby allows quick access and analytics and feedback in any geographical location that a welding floor is located. The raw data analytics module 318 supplies raw data 324 to the database service 323 and to a local or remote storage system 325. Storage system 325 has the capability of storing numerous datatypes or unstructured data. As a non-limiting example, storage system 325 may be a binary large object database accessible over a network, sometimes referred to as a blob storage system 325. The raw data analytics module 318 provides analysis data or metadata pertaining to the raw data 324 along with the raw data 324 to the storage system 325. The local database sorts and stores the raw data 324 and any provided, associated analysis data or metadata provided by the raw data analytics module 318. The storage system 325 provides stored data 326 to the raw data analytics module 318 for correlation to or analysis of data 328 received from the IoT hub 316.

Stored data 326 comprises sorted, curated, or targeted data for the purpose of a particular analysis. It should be understood by those of skill in the art that, as the processed data analytics module 317 and the raw data analytics module 318 receives data from storage system 325, and as storage system 325 is in the form of a query-handling database, processed data analytics module 317 and raw data analytics module 318 programmatically or dynamically select which data or of what type is provided to them by storage system 325 according to programmatically or dynamically scheduled analysis or processing. The database service 323 and the storage system 325 communicates data of any type or format to a machine learning subnet 329 along connections 330 and 331, respectively.

Machine learning subnet 329 analyzes the data and constructs trained operational models 333 for the operation of a welding machine, a weld timer 302, a weld floor component, or groups of welding machines, weld timers 302, or weld floor components. Additionally, machine learning subnet 329 analyzes the data received along connections 330 and 331 to provide mixed models pertaining to a mixed group of welding machines, weld timers 302, and welding floor components. Machine learning subnet 329 provides trained models by using data received along connections 330 and 331 to set or adjust the parameters or goals for simulations of welding applications approximating the real world welding circumstances pertaining to a particular welding machine, weld timer 302, or welding component. The cloud computing service 312 includes a management subnet configured to receive curated data or trained operational models 333 pertaining to a welding machine, a weld timer 302, or a welding floor component from a machine learning trainer 332, for example, a data scientist or a developer. The machine learning subnet uses the received operational models 333 to construct the trained operational models 333.

As explained herein, contribution by a machine learning trainer 332 also comes in the form of manual adjustments to parameters being used in simulations run by the machine learning subnet 329. The machine learning subnet 329 communicates trained operational models 333, trained based at least upon data received along at least one of connections 330 or 331, to an operational models repository 334. The operational models repository 334 communicates operational models to the IoT edge agent software 313 or the IoT hub 316 for introduction of the operational model, which may be a trained operational model 333, back into the cloud computing service 312 or the edge computer 305 and the cell computer 303 for possible interpretation and use by a welding machine, weld timer 302, or a welding floor component. It is contemplated that the interpretation of the operational models 311 may be interpreted by an edge computer 305 or a cell computer 303 for the benefit of a welding machine, weld timer 302, or welding floor component. Further, it is contemplated that operational models 335 may be communicated to the IoT hub 316 for the purpose of further analysis based on new data coming in from an edge computer 305 or a machine learning trainer 332. In the embodiment shown, storage system 325 also communicates with a service plan module 337 which is comprised of a number of APIs 338, 339, configured to with a number of mobile applications, sms services, email services, or the like for purposes, for example, delivering email or text updates on system progress to relevant users.

Service plan module 337 as well as API-Connected analytics module 336 communicates with an API Management module 340 that may communicate with a "DMZ" subnet 341 for handling connections by interested parties 342, for example, engineers, technicians, managers, supervisors, site admins or developers, or anyone else who might need insight to the cloud computing service 312. It is contemplated that interested parties 342 access and permissions to the "DMZ" subnet 341 may be selectively restricted or granted, and authentication of user identity may be required.

It should be appreciated that, as disclosed above, welding machine, welding timer, and welding floor components may suffer wear and tear during usage. The methods and systems described herein are naturally adaptive to any changes in performance due to the naturally adaptive nature of real-time data collection, correlation of that data to operational models, and optimization of those operational models. Further, it should be appreciated that the IoT and cloud service aspects of the methods and systems disclosed herein enable the optimization of operational models for welding machines, welding timers, or welding floor components on the basis of pertinent data collected from any welding machine, welding timer, or welding floor component anywhere within the disclosed embodiments of a weld analytics system.

Various features and advantages of the invention are set forth in the following claims.

What is claimed is:

1. An adaptive welding system comprising:
a first welding machine;
an edge computing system configured to gather weld data from the first welding machine during a welding process; and
a weld analytics system configured to determine an overall weld quality for a plurality of welds performed in the welding process and to build an optimized operational model for the first welding machine based at least upon the weld data and the overall weld quality,
wherein the weld analytics system is further configured to deploy the optimized operational model to the first welding machine by transmitting the optimized operational model to the edge computing system for deployment to the first welding machine,
wherein the weld data includes splatter data, and
wherein building the optimized operational model includes
detecting a splatter trend in the splatter data and,
modifying an operational model to reduce the splatter trend.

2. The adaptive welding system of claim 1 wherein the first welding machine is selected from plurality of welding machines distributed across a plurality of welding plants.

3. The adaptive welding system of claim 1 further comprising a user terminal, wherein the user terminal is configured to
accept user input; and,
adjust, by machine learning software, the optimized operational model based at least upon user input.

4. The adaptive welding system of claim 1 wherein the weld data includes a state of degradation of a welding component of the first welding machine and wherein building the optimized operational model comprises analyzing the state of degradation.

5. The adaptive welding system of claim 2 wherein building the optimized operational model further comprises analyzing weld data from a second welding machine from the plurality of welding machines.

6. The adaptive welding system of claim 5 wherein the first welding machine is positioned in a first welding plant, and the second welding machine is positioned in a second welding plant remote from the first welding plant.

7. An adaptive welding system comprising:
a first welding machine;
a weld analytics system configured to receive weld data from the first welding machine during a welding process, to determine an overall weld quality for a plurality of welds performed in the welding process, and to build an optimized operational model for the first welding machine based at least upon the weld data from the first welding machine, the overall weld quality, and weld data received from other welding machines via a cloud computing service,
wherein the weld analytics system is further configured to deploy the optimized operational model to the first welding machine by transmitting the optimized operational model to an edge computing system for deployment to the first welding machine,
wherein the weld data from the first welding machine includes splatter data, and
wherein building the optimized operational model includes
detecting a splatter trend in the splatter data and,
modifying an operational model to reduce the splatter trend.

8. The adaptive welding system of claim 7 wherein a welding equipment health of the first welding machine is determined via the weld analytics system based at least upon a process stability factor associated with the first welding machine, and a weld quality associated with the first welding machine.

9. The adaptive welding system of claim 8 wherein the process stability factor associated with the first welding machine is provided to the weld analytics system via the first welding machine.

10. The adaptive welding system of claim 8 wherein the weld quality associated with the first welding machine is provided to the weld analytics system via the first welding machine.

11. A method of tracking weld quality for a group of sequential welds comprising:

receiving, via a weld analytics system, a welding plan for a plurality of welds being performed by a first welding machine;
determining, via the weld analytics system, an overall weld quality for the plurality of welds, based at least upon weld data from the first welding machine;
building, via the weld analytics system an optimized operational model for the first welding machine based at least upon the weld data and the overall weld quality;
deploying, via the weld analytics system, the optimized operational model to the first welding machine by transmitting the optimized operational model to the edge computing system for deployment to the first welding machine; and,
wherein the weld analytics system is configured to receive the weld data from the first welding machine during a welding process, and
wherein the weld data from the first welding machine includes splatter data, and
wherein building the optimized operational model includes
detecting a splatter trend in the splatter data and,
modifying an operational model to reduce the splatter trend.

12. The method of claim 11 wherein the plurality of welds includes every weld necessary for an item, and wherein determining, via the weld analytics system, an overall weld quality for the plurality of welds includes determining a weld quality for each weld in the plurality of welds.

13. The method of claim 11 further including
transmitting, via the weld analytics system, a signal indicative of the overall weld quality of the plurality of welds to an interactive user terminal,
providing, via an interactive user terminal, an interactive prompt to a user based on the signal indicative of the overall weld quality of the plurality of welds.

14. The method of claim 13 wherein the interactive prompt includes a prompt to make an adjustment to the first welding machine.

15. The method of claim 14 further comprising the
adjusting, via the weld analytics system, the first welding machine based on input by the user to the interactive user terminal.

* * * * *